(12) United States Patent
Petkov et al.

(10) Patent No.: US 10,546,415 B2
(45) Date of Patent: Jan. 28, 2020

(54) POINT CLOUD PROXY FOR PHYSICALLY-BASED VOLUME RENDERING

(71) Applicant: Siemens Healthcare GmbH, Erlangen (DE)

(72) Inventors: Kaloian Petkov, Lawrenceville, NJ (US); Christoph Vetter, Hopewell, NJ (US); Daphne Yu, Yardley, PA (US)

(73) Assignee: Siemens Healthcare GmbH, Erlangen (DE)

( * ) Notice: Subject to any disclaimer, the term of this patent is extended or adjusted under 35 U.S.C. 154(b) by 54 days.

(21) Appl. No.: 15/426,589

(22) Filed: Feb. 7, 2017

(65) Prior Publication Data

US 2018/0225861 A1 Aug. 9, 2018

(51) Int. Cl.
*G06T 15/08* (2011.01)
*G06T 15/06* (2011.01)

(52) U.S. Cl.
CPC ............. *G06T 15/08* (2013.01); *G06T 15/06* (2013.01); *G06T 2210/41* (2013.01); *G06T 2210/56* (2013.01)

(58) Field of Classification Search
None
See application file for complete search history.

(56) References Cited

U.S. PATENT DOCUMENTS 9,836,885 B1* 12/2017 Eraker .................. G06T 19/003
9,870,644 B2* 1/2018 Ha ........................ G06T 19/006
2009/0295800 A1 12/2009 Vetter et al.
2011/0187704 A1* 8/2011 Chen ..................... G06T 15/00 345/419
2014/0336461 A1* 11/2014 Reiter ................. A61B 1/00193 600/111
2014/0354672 A1* 12/2014 Engel ..................... G06T 15/04 345/589
2015/0213646 A1* 7/2015 Ma ......................... G06T 17/20 345/420
2016/0042559 A1* 2/2016 Seibert ................. G06T 15/506 345/426
2016/0150217 A1* 5/2016 Popov ..................... G06T 15/04 348/48
2017/0004649 A1* 1/2017 Collet Romea ....... G06T 15/205
2017/0108332 A1* 4/2017 Cossairt ............... G01B 11/2518
(Continued)

FOREIGN PATENT DOCUMENTS

WO WO2016032717 A1 3/2016

OTHER PUBLICATIONS

Csébfalvi, B. and Szirmay-Kalos, S.K., Oct. 2003. Monte carlo volume rendering. In Proceedings of the 14th IEEE Visualization 2003 (VIS'03) (p. 59). IEEE Computer Society.*
(Continued)

*Primary Examiner* — Xin Sheng (57) ABSTRACT

Physically-based volume rendering produces pixels. By assigning depths to the pixels, a 3D point cloud is generated. For more rapid rendering, such as due to user interaction, the 3D point cloud rendering is a proxy to physically-based volume rendering. The rendering parameters for the desired image may be determined using the proxy, and then physically-based volume rendering is performed to obtain the desired image.

20 Claims, 2 Drawing Sheets

(56) References Cited

U.S. PATENT DOCUMENTS

2017/0109925 A1* 4/2017 Gritzky .................. G06T 17/20
2018/0033194 A1* 2/2018 Goel ....................... G06T 17/00

OTHER PUBLICATIONS

Smith ("What is APU", 2011, https://www.makeuseof.com/tag/apu-technology-explained/).*
Nielsen ("Response Times: The 3 Important Limits", 1993, https://www.nngroup.com/articles/response-times-3-important-limits/).*
Jiang, H., Guo, S., Meng, S. and Luo, X., Oct. 2011. A novel depth map generation method based on K-means clustering and depth pattern recognition. In Internet of Things (iThings/CPSCom), 2011 International Conference on and 4th International Conference on Cyber, Physical and Social Computing (pp. 638-643). IEEE.*
Wiki ("Path Tracing", 2016, https://en.wikipedia.org/wiki/Path_tracing) (Year: 2016).*
Abdulqawi, Nur Ilham Aminullah, and Mohd Salman Abu Mansor. "A computer method for generating 3D point cloud from 2D digital image." J. Image Graph. 4.2 (2016): 89-92. (Year: 2016).*
Gortler, Steven J., et al. "The lumigraph." Proceedings of the 23rd annual conference on Computer graphics and interactive techniques. ACM, 1996.
Jensen, Henrik Wann, and Niels Jørgen Christensen. "Photon maps in bidirectional Monte Carlo ray tracing of complex objects." Computers & Graphics 19.2 (1995): 215-224.
Krivánek, Jaroslav, et al. "Making Radiance and Irradiance Caching Practical: Adaptive Caching and Neighbor Clamping." Rendering Techniques 2006 (2006): 127-138.
Levoy, Marc, and Pat Hanrahan. "Light field rendering." Proceedings of the 23rd annual conference on Computer graphics and interactive techniques. ACM, 1996.
Veach, Eric, and Leonidas J. Guibas. "Metropolis light transport." Proceedings of the 24th annual conference on Computer graphics and interactive techniques. ACM Press/Addison-Wesley Publishing Co., 1997.
European Search Report dated Jun. 29, 2018 in correspoinding European patent application No. 18153902.4.
Slabaugh G. et al: "Methods for Volumetric Reconstruction of Visual Scenes", vol. 57, No. 3 2004, pp. 179-199, Retrieved from the Internet: URL:https://link.springer.com/content/pdf/10.1023%2FB%3AVISI.0000013093.45070.3b.
European Search Report issued Jun. 29, 2018 in correspoinding European patent application no. 18153902.4.

* cited by examiner

POINT CLOUD PROXY FOR PHYSICALLY-BASED VOLUME RENDERING

BACKGROUND

The present embodiments relate to physically-based volume rendering. Data representing a volume is rendered for visualization. In a medical imaging example, an image from a three-dimensional (3D) scan of a patient is rendered.

Physically-based visualization techniques produce global illumination effects in computer-generated graphics that mimic the real-world interaction of light with various 3D objects or tissues. Monte Carlo path tracing is a useful rendering technique for light transport computations, where the natural light phenomena are modeled using a stochastic process. The physically-based volume rendering results in physically plausible images that are often easier for the human brain to interpret when compared to the more analytical images from traditional volume rendering, such as ray casting or direct volume rendering. For example, subtle ambient light occlusions, soft shadows, color bleeding, and depth of field resulting from physically-based volume rendering provide important depth cues for the spatial understanding of 3D relationships between structures in a single 2D image, whereas simpler visualization techniques may require additional interaction with the viewing parameters (e.g., moving the virtual camera around the 3D data) to obtain the same spatial information from the image parallax.

Evaluation of the rendering integral in physically-based volume rendering may require thousands of stochastic samples per pixel to produce an acceptably noise-free image. Depending on the rendering parameters and implementing processor, producing one photorealistic image with physically-based volume rendering may be on the order of seconds for interactive workflows and multiple hours for production-quality images. Devices with less processing power, such as mobile devices, may take even longer. These rendering times may result in overly long interaction times as the user attempts to refine the rendering to achieve the desired results.

SUMMARY

By way of introduction, the preferred embodiments described below include methods, systems, instructions, and computer readable media for volume rendering via proxy. Physically-based volume rendering produces pixels. By assigning depths to the pixels, a 3D point cloud is generated. For more rapid rendering, such as due to user interaction, the 3D point cloud rendering is a proxy to physically-based volume rendering. The rendering parameters for the desired image may be determined using the proxy, and then physically-based volume rendering is performed to obtain the desired image.

In a first aspect, a method is provided for volume rendering via proxy. A physically-based renderer renders, from a medical dataset representing a three-dimensional region of a patient, pixels representing the three-dimensional region of the patient in two dimensions. A point cloud is generated from the photorealistic image. The point cloud includes depth information. A point-cloud renderer renders another image representing the three-dimensional region of the patient from the point cloud. The other image is transmitted.

In a second aspect, a system is provided for volume rendering via proxy. A memory is for storing data representing an object in three dimensions. A graphics processing unit is configured to render points from the data with path tracing and to generate a point cloud in the three dimensions from the points. A processor is configured to render an image of the object from the point cloud.

In a third aspect, a method is provided for volume rendering via proxy. Monte Carlo-based volume rendering renders data representing a three-dimensional object. Depths are assigned to the data based on scatter points modeled in the Monte Carlo-based volume rendering. A point cloud is generated from the data and the depths.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Point cloud proxies are used for Monte Carlo-based volume rendering. A color point cloud is generated from one or more images rendered by the volume renderer. Every fully-resolved pixel is projected at a certain distance from the virtual camera. Since each pixel is the projection of the volumetric data along a given ray, the system employs one or more heuristics to find the best representative depth. While the resulting point cloud proxy is only a partial approximation of the original rendering, the point cloud is generated in parallel to the original rendering with only a minimal performance impact.

Interactive photorealistic visualization of volumetric data where the renderer uses computationally expensive techniques for the light transport simulation is challenging. Using a point cloud as a proxy for the final color produced by the volume renderer allows more rapid streaming and projection or rendering on remote clients, low-power thin clients, and/or augmented reality (AR) or virtual reality (VR) devices. This retargeted visualization using the point cloud may synthesize novel or different views of the data and allow for limited user interaction without requiring expensive re-rendering with the original Monte Carlo-based volume renderer. The retargeted visualization using the point cloud may be used to further refine the rendering parameters.

Several techniques exist to cache different parts of a rendering to speed up future computations. Irradiance caching is one example from a set of techniques that store the computed global illumination and allow the rendering to use a simpler illumination gather step instead of the full light transport simulation. The render cache and other image-based techniques store full previously rendered images, which are then re-projected to create approximations for the current view. Using a point cloud as the proxy may provide advantages over irradiance caching. The point cloud proxy lowers the computation requirements even further than irradiance caching-like techniques and allows the cached color samples to be displayed at very high rates on low power devices and on AR/VR displays. Compared to reprojection methods, the user may perform limited interaction with the data without requiring a re-rendering of the point cloud data. These interactions may include free camera movement and/or clipping, depending on completeness of the point cloud.

The point cloud data or point cloud rendered image may easily be streamed and updated from a remote render service as the user interacts with the visualization. The pre-rendered point cloud representation is suitable for streaming and display on low power devices and web clients, where certain operations, such as camera rotation, may be supported without computationally expensive re-rendering on the original image.

Figure 1:
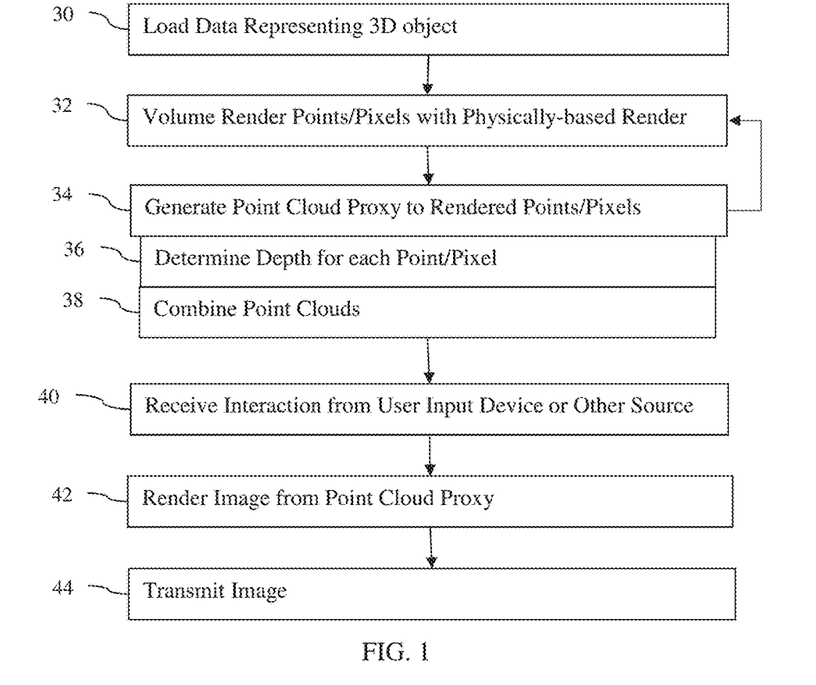
FIG. 1 is a flow chart diagram of one embodiment of a method for volume rendering via proxy.

FIG. 1 shows one embodiment of a method for volume rendering via proxy. Physically-based volume rendering is used to generate a point cloud in 3D. Depths are heuristically assigned to pixels rendered with path tracing, such as Monte Carlo path tracing. The color or intensity and depth for each pixel define the point cloud. For rapid rendering and/or in response to user interaction, images may be rendered from the point cloud as a proxy to the physically-based volume rendering.

The method of FIG. 1 is implemented by a processor and/or a graphics processing unit (GPU) in a server, computer, mobile device, or other machine. In one embodiment, the system of FIG. 3 implements the method of FIG. 1, with or without the medical imager 56, user input 60, and/or display 54. For example, data is input by loading from a memory in act 30, and a processor and/or GPU performs acts 32-44.

The acts are performed in the order shown (top to bottom) or another order. The loop-back from act 34 to act 32 represents a repetition that may or may not be included. Act 40 may occur prior to act 34.

Additional, different, or fewer acts may be provided. For example, act 30 is not provided, such as where the data is streamed or provided from a scanner. In another example, act 38 and the loop back from act 34 to act 32 are not provided. In yet another example, act 40 is not provided. Example additional acts include receiving rendering parameters and physically-based volume rendering a photorealistic image after obtaining a desired image using the point cloud as a proxy.

In act 30, data is loaded from a memory, sensors, and/or other source. The data represents a 3D object, such as a machine or part. The data is formatted as voxels in a uniform or non-uniform 3D grid, but a scan format (e.g., polar coordinate format) may be used. Each voxel or grid point is represented by 3D location (e.g., x, y, z) and an intensity, scalar, or other information.

In one embodiment, the data represents a patient. In the examples below, medical imaging or scanner data is used. In other embodiments, other types of data are used.

A medical scanner may provide the data, such as a medical dataset representing a 3D region of the patient. Any type of medical data is obtained, such as computed tomography, magnetic resonance, positron emission tomography, single photon emission computed tomography, ultrasound, or another scan modality. Scan data representing a 3D volume is loaded as a medical dataset. The scan data may be from multiple two-dimensional scans or may be formatted from a 3D scan.

In act 32, a physically-based renderer renders pixels representing the 3D region of the patient. The physically-based renderer is a graphics processing unit, array of graphics processing units, workstation, server, computer, processor, or other machine capable of the computations. Parallel processing capability is preferred given the repetitive nature of the rendering.

The renderer collapses or projects the 3D representation (i.e., data) of the object into two dimensions. The voxels are converted into pixels. Each pixel represents a point in a display or frame of data as if viewed by a person. In alternative embodiments, the pixels are separately generated for each location without conforming to collapse to a view plane.

In one embodiment, the physically-based renderer renders a photorealistic image of the 3D region of the patient. Any physically-based rendering algorithm capable of computing light transport may be used, such as path tracing, unbiased path tracing, Monte-Carlo path tracing, or Metropolis light transport. The physically-based rendering simulates the physics of light propagation to create an image instead of accumulating volume samples with local illumination along viewing rays from the camera, as is done for traditional direct volume rendering. In path tracing implemented for physically-based rendering, the paths of light or photons, including due to scattering and absorption, are modeled and used for rendering. The physically-based rendering result may be built up over time as the rendering may rely on probabilistic scattering and tracing millions of light paths.

The rendering results in a photorealistic image. A sequence of images may be provided as the image is built or rendered. Alternatively, for a given set of values of rendering parameters, a single image is output. The rendering parameters are a default set, set by the user, determined by a processor, or combinations thereof. The rendering parameters may include data consistency parameters. Data consistency parameters include windowing, scaling, level compression, data normalization, or others. The rendering parameters may include transfer function design parameters. Transfer function design parameters include classification look-up tables, multi-dimensional transfer functions, tissue-specific transfer functions, or other transfer functions. The rendering parameters may include lighting design parameters. Lighting design parameters include type of virtual lights, position of the virtual light sources, orientation of the virtual light sources, image-based lighting sources, ambient lighting, or others. The rendering parameters may include viewing design parameters. Viewing design parameters include type of camera, position of the camera, orientation of the camera, intrinsic parameters for viewing, or others. One or more use-case specific parameters may be provided. Use-case specific parameters are settings specific to a given use, such as a particular camera position for a given type of medical report or use of two cameras for stereoscopic viewing.

The parameters may be specific to physically-based rendering, such as internal render properties. The setting for any parameter for path tracing, unbiased path tracing, Monte Carlo rendering, global (i.e., indirect) illumination, or other simulations of light propagation may be used. For example, a global albedo or surface reflectance coefficient, which describes the relative importance of light scattering versus light absorption, may be used. During path tracing, different levels or amounts of scattering and/or absorption are modeled for different locations based on the data representing the 3D object. The scattering and/or absorption of photons is modeled for each sampling point (e.g., voxel). Transparency, reflectivity, surface roughness, and/or other properties derived from the data may be modeled in the physically-based rendering. Albedo may be a per-material property for the different tissue classes in the volume data.

The output of the renderer in one embodiment is a 2D grid of pixels that matches the resolution of the display output device. In one embodiment, this output is used as-is and without any modification to the rendering algorithm. Each pixel represents a visual characteristic for a different area. For example, each pixel includes a color value (e.g., red, green, blue (RGB) value). A scalar or grey scale value may be used instead of color.

In act 34, a processor generates a point cloud from the photorealistic image. The processor is the same or different device used to render in act 32.

To generate the point cloud in act 34, depths are determined in act 36 for the pixels from the rendering of act 32. A depth value is generated for each pixel and the color+depth information is used to generate the point cloud. The point cloud provides 3D position for the pixels, so includes depth information relative to the viewer of the pixel.

In physically-based volume rendering, a single or given pixel produced from the volume renderer contains the projection of points along a viewing ray through the volume. Therefore, it is not possible to define a single depth value for that pixel in the general case. To generate depths for the pixels, one or more heuristic algorithms compute representative depths along viewing rays. Viewing rays are simulated through the volume. These primary viewing rays intersect with voxels.

In one example, the depth for a given pixel is assigned based on opacity. The opacity of the voxels along the viewing ray for that pixel are examined. The maximum opacity may be found. The depth of the voxel with the maximum opacity relative to the viewer is used as a depth of the color or pixel. Rather than maximum opacity, accumulated opacity may be used. The opacities progressing away from the viewer along the ray are summed or combined (e.g., alpha blending). The depth at which the accumulation reaches a threshold amount is assigned to the color or pixel. The threshold may be set as a default, based on the rendering application, or set by the user. For example, the threshold is based on a selected transfer function used in the rendering of act 32. Other optical models may be used to determine the threshold.

In another example, the depth is located with clustering. Each of the sampling points used by the physically-based renderer in rendering the pixels include an amount of scattering. The sampling points along a view ray is based on the optical model used in rendering. The density of the sampling points where photon scattering is evaluated is determined by the optical model and may be a function of the voxel opacity. By clustering sampling points, a depth or depth range associated with the greatest cluster (e.g., greatest average scattering, greatest total scattering, greatest number of sample points in the cluster, and/or nearest depth with sufficient cluster of scattering) is assigned to the pixel or color. For the pixels, depths are assigned to the pixel data based on scatter points modeled in the Monte Carlo-based volume rendering.

Any clustering may be used. For example, k-means clustering of the scatter points along the view rays is performed. Each scatter point in the volume is treated as a "local" surface in terms of the lighting computations and the "local" lighting may be implemented with the traditional models (e.g., Phong). A small clustering of scatter points along a viewing ray may indicate a 3D structure that globally looks like a strong surface (compared to a solid semi-transparent region) and therefore the cluster center may be good candidate for the point cloud. Each cluster along the ray corresponds to a depth at which it is more likely that a scattering event would occur, which corresponds to strong surface-like properties at that 3D point in the volume data. The cluster-identified depth is a good candidate for generating a point for the point cloud. By finding a cluster or grouping of similar probabilities of scattering, a proxy surface is identified. The depth of the surface is used. The depths for clusters of the scatter points are assigned. In another example, the clustering uses a histogram of the back scatter. The bin of the histogram with the greatest number of members is found. An average depth or depth of the closest scatter point that is a member of the selected bin is assigned to the color or pixel. Alternatively, the bin of the histogram with sufficiently high scatter probability and sufficiently high number of members is used.

Other heuristics may be used. Combinations of heuristics may be used.

The point cloud is generated from the depth and pixel information. The rendered data (e.g., color) is assigned a depth. Based on the geometry of the object as represented in the rendered pixels relative to the viewer, a point cloud of the colors or pixels in 3D space is generated.

In other embodiments, more than one depth may be assigned along a given viewing ray or for a given pixel. For example, clustering may show several surfaces. The color is assigned to each surface. Alternatively, the scattering for each surface is used to assign a surface specific color as part of the rendering. For each view or primary view ray, colors for multiple depths are provided. Where a given ray does not pass through a surface, no color and depth is assigned. Where a given ray passes through only one surface, only one depth is assigned. In an alternative, windowing is used to modify the classification. Different objects represented by the 3D data are rendered separately, providing for different depths and different colors depending on the object being rendered. In yet another alternative, rendering and depth assignment are provided in a sequence where outer layers of data are progressively removed.

The point cloud from a given camera position may be used alone as a proxy. In other embodiments, the rendering of the pixels in act 32 and the generation of a point cloud in act 34 are repeated for different camera positions. The camera is repositioned relative to the volume represented by the data for increased sampling. The volumetric data is rendered from a set of different vantage points to provide a more complete 3D point cloud.

Any sampling of camera position and/or orientation may be used. The vantage point and/or viewing direction selection are performed using any criterion. For example, a fixed set of points in 3D space are used to provide regular sampling of the bounding sphere of the volume. A bounding circle on a planar surface or any sampling of a 3D curve in space may be used. As another example, a randomized set of points in 3D space, with or without stratified sampling, are used. In yet another example, data specific or work-flow specific set of points are used, such as vantage points near regions of interest (ROIs). In another example, the viewing directions are fixed, pointed at the center of the volume, pointed at an ROI, or custom directions based on the vantage point. Based on the sampling of the bounding sphere or other sampling of camera positions and/or orientations, physically-based rendering and point cloud generation are performed from different perspectives.

In one embodiment, the volume renderer is modified to sample camera positions or orientations. Rather than producing a 2D image of pixels, each pixels is generated separate from other pixels. The rendering for each pixel is performed with the pixels sampling a bounding sphere for the region with randomized viewing rays. The volume renderer is modified with a virtual camera optimized for generating point clouds. As one specific example, the pixels in the 2D image sample the bounding sphere of the volume, instead of the traditional rectangular viewport, with randomized viewing rays that intersect the bounding box of the volume. While the resulting image may not be directly usable in a traditional workflow, the point cloud will be more uniform compared to one generated from the traditional viewport images.

In act 38, the point clouds generated from the different cameras are combined. For example, by generating a point cloud with viewing along each of six cardinal directions, a point cloud over the entire volume may be stitched together. The point clouds are combined into a combined point cloud. For points with overlap from different cameras, filtering, averaging, and/or selection may be used. The point clouds are formed into a combined point cloud for the three-dimensional region.

The point cloud output from act 34 or act 38 is used as a proxy for 3D rendering. Rather than waiting for physically-based rendering with different rendering parameters, the point cloud generated from a physically-based rendering may be rendered to emulate or be a close substitute.

In act 40, a processor receives an interaction from a user input device. For example, a touch screen, mouse, keyboard, trackball, or other device receives input from a user. This input is from user interaction with a user interface. The interaction is transmitted from the user input device to the processor performing act 42 or to a processor that then transmits to the processor performing act 42.

The interaction is relative to an image of the pixels, another image, or a user interface for rendering an image. For example, a photorealistic image generated by physically-based volume rendering or rendering of a point cloud proxy is displayed. The user inputs an alteration of a value or setting of a rendering parameter after viewing the image. This interaction provides for a change in the rendering. For generating a physically-based volume rendering, each change may be associated with seconds, minutes or hours of waiting for sufficient rendering. To avoid this delay, the point cloud is used as a proxy.

In act 42, a point-cloud renderer renders an image representing the three-dimensional region of the patient from the point cloud. The point-cloud renderer is a GPU, processor, computer, server, mobile device, or other renderer configured to render from a point cloud. The point-cloud renderer may be a same or different device used to physically-based volume render in act 32 and/or generate the point cloud in act 34.

The point-cloud renderer is configured to render from a 3D point cloud to a 2D image for display on a 2D display device, such as a screen. Any point-cloud rendering may be used, such as the Potree or Euclidean point-cloud renderer. Alternatively, the point cloud is surface reconstructed (e.g., mesh or surface model), and a surface renderer renders from the reconstructed surface. In yet another alternative, the point cloud is converted into a volumetric distance field to reconstruct an implicit field through a marching cubes algorithm.

The rendering from the point cloud is responsive to the interaction. For rendering with the same rendering parameters, the photorealistic image from the physically-based rendering may be used. Once the interaction indicates a change, then the point cloud is used to more rapidly provide an image approximating the results of the change in the photorealistic image from physically-based volume rendering.

The interaction may be a change in a setting of any rendering parameter. For example, the interaction calls for a rendering with different clipping, illumination, coloring, windowing augmentation, and/or camera position than the rendering of the pixels in act 32. The clipping may act to remove parts of the volume and/or point cloud for rendering. The windowing augmentation may act to remove segments of the volume and/or points in the point cloud associated with different parts. The coloring may act to color one or more points differently, such as coloring points associated with a region of interest, organ of interest, lesion, tumor, or abnormality differently. The camera position may provide for a different camera location and/or orientation relative to the volume. The illumination may change an intensity, location, or other characteristic of direct lighting and/or may change a characteristic of ambient or indirect lighting (e.g., intensity). Other rendering parameters or combinations of rendering parameters may be altered.

Depending on the completeness of the point cloud, various techniques may be used to adapt the point cloud for rendering. The point size may be adjusted to fill gaps due to viewing from different angles. Interpolation, filtering an image, or other techniques may be used.

The rendering burden may be distributed between the physically-based volume rendering and the point cloud volume rendering. For example, background or locations spaced from a region of interest may be rendered using the point cloud and other parts rendered using the physically-based volume rendering. In one approach, the physically-based volume rendering is performed with a lighting model for indirect or ambient illumination. The point cloud rendering adds direct or local illumination, such as from a modeled or measured light source. The physically-based volume renderer is modified to store only the indirect illumination computed from the renderer. Local illumination is then calculated when rendering the point cloud, allowing for additional interaction freedom during the point cloud rendering at potentially reduced image quality.

Figure 2A:
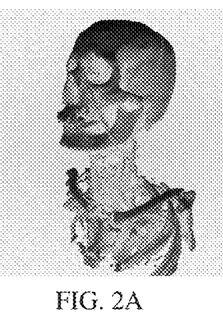
FIGS. 2A-D show four example renderings from a point cloud generated from physically-based volume rendering.
Figure 2B:
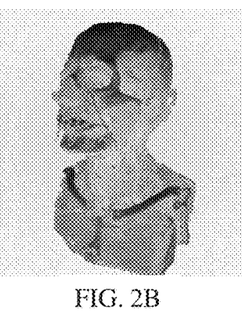
Figure 2C:
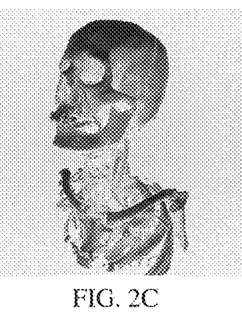
Figure 2D:
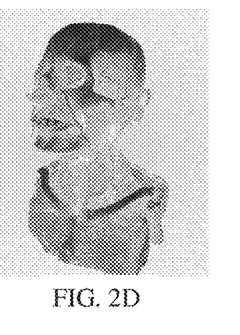

FIGS. 2A-D show example renderings from a same point cloud. Potree point-cloud rendering is performed using a point cloud from one physically-based volume rendering using Monte Carlo path tracing. The point cloud rendering is run on a web client. FIG. 2A is a point cloud rendering with windowing set to just depths associated with bone. FIG. 2B is a point cloud rendering with the windowing set to include muscle and bone. FIGS. 2C and 2D are the same as FIGS. 2A and 2B, respectively, but with different local lighting using the Eye-Dome Lighting technique. The point cloud rendering may allow for variation of rendering parameters to assist in more rapid diagnosis and/or determination of settings for a more detailed physically-based rendered image for assisting in diagnosis.

The point cloud rendering may be used to create images at a greater frequency with and/or without changes in rendering parameters. For example, the point cloud rendering provides images at 40 Hz, 50 Hz, 90 Hz or other frequencies for virtual reality and/or augmented reality viewing. The point cloud rendering allows for more rapid response to change in camera position in augmented and/or virtual reality. Based on the interaction from position and/or orientation sensors, an image or images are rendered from the point cloud. In another example, the point cloud rendering provides one or both of two images used for stereo in virtual reality imaging.

In act 44, the image or images rendered from the point cloud are transmitted. The interaction of act 40, point cloud rendering of act 42, and transmittal of act 44 may be repeated, such as where the user continues to interact with the image for further rendering.

The point cloud renderer, host computer of the renderer, or other device transmits the image or images with or without transmission of a photorealistic image. The transmission is over a bus, through a network interface, over a network, to a memory, or to a display. For example, the image is loaded into a buffer and output from the buffer to a display for viewing by a physician to aid diagnosis or pre-operative planning. A computer-generated representation of the medical data suitable for viewing by human users (e.g., 2D images, videos, stereoscopic image pairs, volumes, holograms, or lightfields) is output. Alternatively, the output may be for storage and/or for machine analysis.

The transmission may be for any one or more of various purposes. In one embodiment, the transmission of a final photorealistic image generated based on rendering settings determined using proxy rendering of a point cloud is part of a diagnostic report. A given diagnostic report may be specific to context, such as a report for kidney stones. Any kidney stones should be visible in an image. The photorealistic image shows kidney stones based on the values of the rendering parameters determined through interaction and proxy rendering. The optimal context-specific images are provided for a diagnostic report in the clinical workflow.

In another embodiment, the transmission is to a display as an image for interactive viewing. The interaction with more rapid point cloud rendering is used to quickly determine the desired values of rendering parameters. Other uses of images rendered from the proxy may be provided.

In yet another embodiment, the transmission is to an augmented reality device. For example, a physician may wear augmented reality glasses. The image, with or without added annotations or graphics, from the point cloud rendering is projected onto the glasses as an overlay on the actual view seen by the wearer. In other example, the image is combined with a camera image and/or is used as a replacement for the camera image. In an augmented reality setup, the rendered image may be overlaid onto a live stream of real-time medical images (ultrasound, x-ray, optical laparoscopy, etc.). The transmission may be to other mobile devices, such as smart phones, tablets, glasses, wearable displays, and/or carriable displays.

Figure 3:
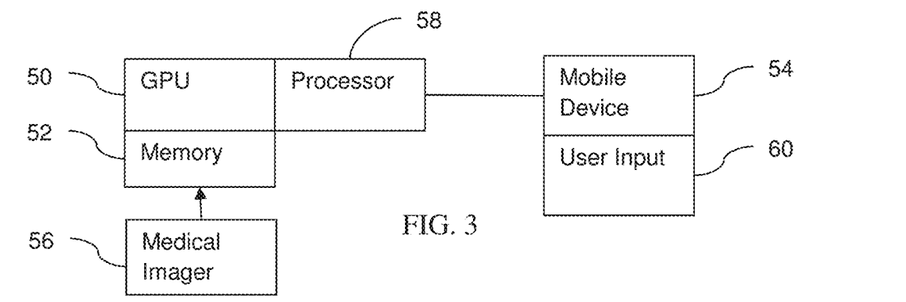
FIG. 3 is a block diagram of one embodiment of a system for volume rendering via proxy.

FIG. 3 shows a block diagram of one embodiment of a system for volume rendering via proxy. The system uses Monte Carlo path tracing or other simulation of photon propagation with scattering and absorption of light to render colors for different locations. Depth is assigned to the locations to generate a 3D point cloud. The 3D point cloud is then used as a proxy for rendering images more rapidly than provided with the path tracing. This allows interaction or other operations to occur more rapidly to assist in determining how to render a more slowly rendered photorealistic image with path tracing.

The system implements the method of FIG. 1. Other methods or acts may be implemented, such as generating a 3D point cloud from Monte Carlo path tracing and rendering an image from the point cloud.

The system includes a graphics processing unit 50, a memory 52, a mobile device 54, a medical imager 56, a user input device 60, and a processor 58. Additional, different, or fewer components may be provided. For example, the medical imager 56 and/or memory 52 are not provided. In another example, a network or network connection is provided, such as for networking between the processor 58 to the mobile device 54. A user interface may be provided for interacting with the GPU 50, processor 58, or other components.

The GPU 50, memory 52, and/or processor 58 are part of the medical imager 56. Alternatively, the GPU 50, memory 52, and/or processor 58 are part of a server, workstation, or computer separate from the medical imager 56. The GPU 50, memory 52, and/or processor 58 are a personal computer, such as desktop or laptop, a workstation, a server, a network, or combinations thereof. In yet other embodiments, the GPU 50 and memory 52 are part of a separate computer from the processor 58. The processor 58 may be part of the medical imager 56, the GPU 50, the mobile device 54, or be a separate component.

The medical imager 56 is a medical diagnostic imaging system. Ultrasound, computed tomography, x-ray, fluoroscopy, positron emission tomography (PET), single photon emission computed tomography (SPECT), and/or magnetic resonance systems may be used. The medical imager 56 may include a transmitter and includes a detector for scanning or receiving data representative of the interior of the patient. The medical imager 56 acquires scan data representing the patient. The scan data represents a volume of the patient, such as an N×M×R region where N, M, and R are integers greater than 1 (e.g., 100×100×100).

In alternative embodiments, the medical imager 56 is not provided, but a previously acquired dataset for a patient is stored in the memory 52. In yet other alternatives, data from other scanners for non-medical use is provided. Rather than a medical imager 56, another scanner may be used.

The memory 52 is a graphics processing memory, a video random access memory, a random access memory, system memory, cache memory, hard drive, optical media, magnetic media, flash drive, buffer, database, combinations thereof, or other now known or later developed memory device for storing data representing an object in three dimensions, rendering parameters values, medical datasets, and/or other information. The memory 52 is part of the medical imager 56, part of a computer associated with the GPU 50, part of a computer associated with the processor 58, a database, part of another system, a picture archival memory, or a stand-alone device.

The memory 52 stores scan data representing one or more patients. For example, data from the medical imager 56 is stored. The data is in a scan format or reconstructed to a three-dimensional grid format. The scan data is stored for rendering using light transport simulation.

The memory 52 or other memory is alternatively or additionally a non-transitory computer readable storage medium storing data representing instructions executable by the programmed GPU 50, processor 58, and/or mobile device 54. The instructions for implementing the processes, methods, and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The GPU 50 is a graphics chip, graphics card, multi-core processor or other device for parallel processing to perform physically-based volume rendering. The GPU 50 is part of a computer, workstation, server, or mobile device 54. The GPU 50 is configured by software, hardware, and/or firmware to implement physically-based volume rendering. Monte Carlo path tracing or other technique for probabilistically or stochastic simulation of scattering and/or absorption of photons is used to render color, intensity, or other characteristic for points. The GPU 50 is configured by an application programming interface to render an image from the 3D scan data representing a patient. Using physically-based rendering, a photorealistic image is rendered.

The rendering reduces the dimensionality of the 3D data. The GPU 50 renders points from data representing a 3D object in three dimensions. The points are pixels in a 2D view plane, such as colors for pixels for an image. Alternatively, the points are for colors rendered based on random sampling of a boundary or bounding sphere of the volume.

The processor 58 is a general processor, digital signal processor, the GPU 50, processor of the GPU 50, application specific integrated circuit, field programmable gate array, control processor, processor of the mobile device 54, or another processor. The processor 58 is part of a computer, workstation, server, or mobile device 54.

The processor 58 is configured by hardware, software, and/or firmware to render an image of an object from a point cloud. Any point cloud rendering may be used. The processor 58 renders the 2D image from the 3D point cloud representing the object. Based on interaction from the user input device 60, other user input device, and/or programmed settings, the image is rendered.

The GPU 50 and/or processor 58 are configured to generate the point cloud. The physically-based volume rendering generates colors for points or pixels. The depth or depths associated with each point or pixel is determined. Any heuristic may be used to establish the depth, such as using clustering of scattering modeled by the path tracing. The 3D point cloud is generated from the colors and depths.

The mobile device 54 is a smart phone, tablet, laptop computer, virtual reality headset, augmented reality camera, wearable device, or other device that may be carrier by or on a user. The mobile device 54 includes a display, such as a touch screen. The display is configured by the mobile device 54 to present or display an image and/or user interface. The display is a monitor, LCD, projector, plasma display, CRT, touch screen, or other now known or later developed device for displaying an image or images.

The mobile device 54 includes the user input device 60. The user input device 60 is a touch screen, mouse, trackball, trackpad, button, knob, keyboard, and/or other device for receiving user interaction. The mobile device 54 responds to the interaction by rendering from a point cloud or communicates the interaction to the processor 58 or GPU 50 for rendering from the point cloud by the processor 58 or GPU 50.

Various arrangements of components may be used. In one embodiment, the GPU 50 and processor 58 are part of a server, and the mobile device 54 acts as a client via an application or web client. The server performs rendering so that the mobile device 54 may avoid processing associated with rendering. Any division of processing to physically-based render, generating the point cloud, and rendering from the point cloud may be provided between the GPU 50 and the processor 58. Only one of the GPU 50 and the processor 58 may be used or both devices combined.

Communications are handled over a computer network, such as communicating user interaction from the mobile device 54 to the server and rendered images from the server to the mobile device 54. The server provides rapid rendering from the point cloud, such as providing an image within a few seconds (e.g., 5 seconds or less) of receiving an interaction at the user input device 60.

High quality photorealistic rendering (e.g., using Monte Carlo path tracing) is computationally expensive and may not be suitable for direct rendering on low powered mobile devices 54. The results of such rendering may be explored on a web application or the mobile device 54 using a point cloud proxy. The proxy provides for various degrees of interaction without having to re-renderer the full image. This approach may be used to provide an interactive pre-visualization for a remote connection to a rendering service.

For AR or VR applications, the requirement for rapid (e.g., 90+ Hz) screen refreshes makes many traditional forms of photorealistic rendering infeasible, whereas the point cloud proxies generated from such rendering systems may be rendered at such high frames even on relatively low-power devices. The point cloud format also allows seamless integration of the rapidly rendered image from the point cloud with added data and/or an image from a camera in AR applications.

In other embodiments, the mobile device 54 receives a point cloud generated by the server and performs point cloud rendering. In alternative embodiments, the mobile device 54 generates the point cloud from a received image rendered using path tracing. In yet another embodiment, the mobile device 54 is not provided. The renderings and point cloud generation are performed on a computer, such as a workstation or desktop without communication to a remote mobile device 54. In another alternative embodiment, the mobile device 54 performs the renderings and generation of the point cloud without using the server.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for volume rendering via proxy, the method comprising:
   rendering, by a physically-based renderer and from a medical dataset representing a three-dimensional region of a patient, pixels representing the three-dimensional region of the patient in two dimensions, the physically-based renderer collapsing from the three-dimensional region to the pixels in the two dimensions based on rendering parameters including computation of light transport in a physics model simulating light scattering stochastically, the pixels comprising a photorealistic two-dimensional image;

generating a point cloud proxy from color or scalar values and depth information of the photorealistic two-dimensional image assigned during the rendering of the pixels, the point cloud proxy being a proxy for subsequent physically-based rendering of the three-dimensional region of the patient;

rendering, by a point-cloud renderer, another photorealistic two-dimensional image representing the three-dimensional region of the patient, including illumination effects, from the point cloud proxy, the other photorealistic two-dimensional image being a substitute for re-rendering the pixels with the physically-based renderer for different rendering parameters; and displaying the other photorealistic two-dimensional image on a display screen.

2. The method of claim 1 wherein rendering the pixels comprises rendering with path tracing.

3. The method of claim 1 wherein rendering the pixels comprises Monte Carlo-based rendering.

4. The method of claim 1 wherein generating comprises locating a depth for each of the pixels from a maximal opacity or an accumulated opacity along a viewing ray.

5. The method of claim 1 wherein generating comprises locating a depth for each of the pixels with clustering of sampling points used by the physically-based renderer in rendering the pixels.

6. The method of claim 1 wherein generating comprises generating a plurality of depths for at least some of the pixels, and wherein rendering the other image comprises rendering with one of the plurality of depths for the some of the pixels.

7. The method of claim 1 wherein rendering the other image comprises rendering the other image with a different clipping, illumination, coloring, windowing augmentation, or camera position than the rendering of the pixels.

8. The method of claim 1 wherein rendering the other image comprises rendering the other image as a stereo or virtual reality view created from the point cloud proxy.

9. The method of claim 1 wherein the physically-based renderer comprises a server, and wherein transmitting comprises transmitting to a mobile device.

10. The method of claim 1 wherein rendering the pixels comprises rendering with indirect illumination, and wherein rendering the other image comprises rendering with direct illumination.

11. The method of claim 1 further comprising receiving an interaction from a user input device, the interaction relative to the photorealistic image of the pixels, and wherein rendering the other image comprises rendering from the point cloud proxy based on the interaction.

12. The method of claim 1 further comprising:
repeating the rendering of the pixels and generating the point cloud proxy for different camera positions relative to the three-dimensional region; and combining the point cloud proxies into a combined point cloud proxy for the three-dimensional region;
wherein generating the other image comprises generating from the combined point cloud proxy.

13. method of claim 1 wherein rendering the pixels comprises rendering with the pixels sampling a bounding sphere for the region with randomized viewing rays.

14. A system for volume rendering via proxy, the system comprising:
a memory for storing data representing an object in three dimensions;
a graphics processing unit configured to render points from the data with path tracing including probabilistic scattering, the points rendered from the three dimensions collapsed to a two dimension distribution of the points representing a view of the object in three dimensions, and to generate a point cloud proxy in the three dimensions from color or scalar values and depth information of the points in the two dimension distribution assigned during the rendering of the points, the point cloud proxy being a proxy for subsequent rendering of the data representing the object; and
a processor configured to render an image of the object from the point cloud proxy, the image being a substitute for re-rendering the points from the three dimensions for different rendering parameters.

15. The system of claim 14 wherein the processor is part of the graphics processing unit.

16. The system of claim 14 wherein the graphics processing unit is part of a server, and further comprising a mobile display configured to display the image.

17. The system of claim 16 further comprising a user input device with the mobile display, wherein the processor is configured to render the image based on interaction from the user input device and to deliver the image to the mobile display within five seconds of the interaction.

18. The system of claim 14 wherein the graphics processing unit is configured to generate the point cloud proxy with depths for the points based on scattering modeled by the path tracing.

19. A method for volume rendering via proxy, the method comprising:
Monte Carlo-based volume rendering data representing a three-dimensional object;
assigning depths to the Monte Carlo-based volume rendered data, the depths assigned from a density of scatter points modeled during the Monte Carlo-based volume rendering;
generating a point cloud proxy from the Monte Carlo-based volume rendered data and the depths, the point cloud proxy being a proxy for subsequent rendering of the data representing the three-dimensional object; and
rendering an image from the point cloud proxy, the image being a substitute for Monte Carlo-based re-rendering of the data for different rendering parameters.

20. The method of claim 19 wherein assigning the depths comprises k-means clustering of the scatter points and determining the depths for clusters of the scatter points.

* * * * *